(12) United States Patent
Serlet

(10) Patent No.: US 8,949,339 B2
(45) Date of Patent: Feb. 3, 2015

(54) SYSTEM AND METHOD FOR AUTOMATIC OPPORTUNISTIC DATA AND IMAGE SHARING

(75) Inventor: Bertrand Philippe Serlet, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 967 days.

(21) Appl. No.: 11/970,660

(22) Filed: Jan. 8, 2008

(65) Prior Publication Data

US 2009/0177748 A1 Jul. 9, 2009

Related U.S. Application Data

(60) Provisional application No. 60/883,968, filed on Jan. 8, 2007.

(51) Int. Cl.
| | |
|---|---|
| *G06F 15/16* | (2006.01) |
| *G06Q 10/10* | (2012.01) |
| *H04L 12/58* | (2006.01) |
| *H04M 3/42* | (2006.01) |
| *H04L 29/08* | (2006.01) |

(52) U.S. Cl.
CPC ......... *G06Q 10/107* (2013.01); *H04M 3/42042* (2013.01); *H04L 12/58* (2013.01); *H04L 67/306* (2013.01); *H04L 51/02* (2013.01)
USPC ............................. 709/206; 709/226; 709/246

(58) Field of Classification Search
None
See application file for complete search history.

(56) References Cited

U.S. PATENT DOCUMENTS

| | | | | |
|---|---|---|---|---|
| 6,073,133 | A * | 6/2000 | Chrabaszcz | 1/1 |
| 6,298,228 | B1 * | 10/2001 | Singh | 455/403 |
| 6,501,834 | B1 * | 12/2002 | Milewski et al. | 379/93.24 |
| 6,701,348 | B2 * | 3/2004 | Sommerer | 709/206 |
| 6,754,665 | B1 * | 6/2004 | Futagami et al. | 1/1 |
| 7,007,066 | B1 * | 2/2006 | Malik | 709/206 |
| 7,058,686 | B2 * | 6/2006 | Jin | 709/206 |
| 7,627,311 | B2 | 12/2009 | Oijer | |
| 7,627,637 | B2 * | 12/2009 | Malik | 709/206 |
| 7,752,282 | B2 * | 7/2010 | Noda | 709/217 |
| 8,176,131 | B2 * | 5/2012 | Masonis et al. | 709/206 |
| 2001/0056469 | A1 * | 12/2001 | Oonuki | 709/206 |
| 2002/0026488 | A1 * | 2/2002 | Ogawa | 709/206 |
| 2002/0052921 | A1 * | 5/2002 | Morkel | 709/206 |
| 2002/0078157 | A1 * | 6/2002 | Matsumoto | 709/206 |
| 2002/0080413 | A1 * | 6/2002 | Sommerer | 358/402 |

(Continued)

*Primary Examiner* — Ian N Moore
*Assistant Examiner* — Dung B Huynh
(74) *Attorney, Agent, or Firm* — Wong, Cabello, Lutsch, Rutherford & Brucculeri, LLP

(57) ABSTRACT

A system for requesting data from another includes means for automatically appending a request for certain information to an outgoing message. In one embodiment, an e-mail editor includes an on-screen "radio button" for causing a request for missing contact information to be appended to the message being composed. The system may automatically parse incoming messages for the requested information which may be extracted and stored automatically. Information may be associated with a date which triggers an automatic request for updated information. Certain embodiments of the invention may be one-sided—implemented on a single programmed system. Other embodiments are implemented on multiple systems such that the process may be automated on both the requesting and replying systems. In yet other embodiments, a website or file server is employed to upload and download requested information.

14 Claims, 5 Drawing Sheets

(56) References Cited

U.S. PATENT DOCUMENTS

| | | | |
|---|---|---|---|
| 2002/0107924 A1* | 8/2002 | Walsh | 709/206 |
| 2002/0178228 A1* | 11/2002 | Goldberg | 709/206 |
| 2003/0101065 A1* | 5/2003 | Rohall et al. | 705/1 |
| 2003/0158860 A1* | 8/2003 | Caughey | 707/200 |
| 2003/0220977 A1* | 11/2003 | Malik | 709/206 |
| 2003/0236769 A1* | 12/2003 | Pyhalammi | 707/1 |
| 2004/0059786 A1* | 3/2004 | Caughey | 709/206 |
| 2004/0068499 A1* | 4/2004 | Adar et al. | 707/7 |
| 2004/0070678 A1* | 4/2004 | Toyama et al. | 348/231.3 |
| 2004/0179672 A1* | 9/2004 | Pagel et al. | 379/266.1 |
| 2004/0185883 A1* | 9/2004 | Rukman | 455/466 |
| 2004/0186893 A1* | 9/2004 | Ochiai | 709/206 |
| 2005/0091074 A1* | 4/2005 | Feldhahn | 705/1 |
| 2005/0091272 A1* | 4/2005 | Smith et al. | 707/104.1 |
| 2005/0097441 A1* | 5/2005 | Herbach et al. | 715/501.1 |
| 2005/0223072 A1* | 10/2005 | Greve et al. | 709/206 |
| 2006/0027648 A1* | 2/2006 | Cheah | 235/381 |
| 2006/0069809 A1 | 3/2006 | Serlet | |
| 2006/0075053 A1* | 4/2006 | Xu et al. | 709/206 |
| 2006/0080284 A1* | 4/2006 | Masonis et al. | 707/3 |
| 2006/0095524 A1* | 5/2006 | Kay et al. | 709/206 |
| 2006/0168072 A1 | 7/2006 | Park | |
| 2007/0130329 A1* | 6/2007 | Shah | 709/224 |
| 2007/0152036 A1* | 7/2007 | Daigle et al. | 235/380 |
| 2007/0192418 A1* | 8/2007 | Adams et al. | 709/206 |
| 2007/0219958 A1* | 9/2007 | Park et al. | 707/3 |
| 2007/0233459 A1* | 10/2007 | Perronnin | 704/9 |
| 2007/0250550 A1* | 10/2007 | Berninger | 707/203 |
| 2008/0022220 A1* | 1/2008 | Cheah | 715/769 |
| 2008/0037720 A1* | 2/2008 | Thomson et al. | 379/88.01 |
| 2008/0114649 A1* | 5/2008 | Swirsky et al. | 705/14 |
| 2008/0118048 A1* | 5/2008 | Lowe | 379/218.01 |
| 2008/0208971 A1* | 8/2008 | Costin et al. | 709/204 |
| 2008/0243789 A1* | 10/2008 | Kussmaul et al. | 707/3 |
| 2009/0054091 A1* | 2/2009 | van Wijk et al. | 455/466 |
| 2009/0131013 A1* | 5/2009 | Saiin | 455/405 |
| 2009/0157717 A1* | 6/2009 | Palahnuk et al. | 707/101 |
| 2009/0222493 A1* | 9/2009 | Smarr et al. | 707/203 |
| 2009/0292785 A1* | 11/2009 | Leedberg et al. | 709/206 |
| 2010/0299388 A1* | 11/2010 | Bolnick et al. | 709/203 |
| 2011/0087747 A1* | 4/2011 | Hirst et al. | 709/206 |
| 2011/0302255 A1 | 12/2011 | Miller | |

* cited by examiner

SYSTEM AND METHOD FOR AUTOMATIC OPPORTUNISTIC DATA AND IMAGE SHARING

CROSS-REFERENCE TO RELATED APPLICATIONS

This application claims the benefit of U.S. Provisional Application No. 60/883,968 filed Jan. 8, 2007.

STATEMENT REGARDING FEDERALLY SPONSORED RESEARCH OR DEVELOPMENT none

BACKGROUND OF THE INVENTION

1. Field of the Invention

This invention relates to data sharing between processor-based systems. More particularly, it relates to systems and methods for populating and updating the various data fields in a Personal Information Manager application program or other programs in which structured data is replicated across multiple nodes.

2. Description of the Related Art

One of the most common applications for personal computers is the storage and management of personal information, one example of which is contact information—a person's name, title, telephone number(s), location, e-mail address and the like. Similar information may be stored and retrieved for business entities and other organizations.

As the size, cost and power requirements of microprocessors and data storage devices have decreased, applications for personal information management have moved to other processor-based systems such as Personal Digital Assistants (PDA's), Smart Phones, electronic address books and the like.

A personal information manager (PIM) is a type of application software that functions as a personal organizer. As an information management tool, a PIM's purpose is to facilitate the recording, tracking, and management of certain types of "personal information". Personal information can include any of the following: personal notes/journal entries; address books; lists (including task lists); significant calendar dates (e.g., birthdays, anniversaries and appointments), e-mail and/or instant message archives, fax communications, voicemail and project management features.

One method of the prior art for exchanging contact information is the so-called vCard. vCard is a file format standard for personal data interchange, specifically electronic business cards. vCards are often attached to e-mail messages, but can be exchanged in other ways, such as on the World Wide Web. They can contain name and address information, phone numbers, URLs, logos, photographs, and even audio clips.

The vCard or Versitcard was originally proposed in 1995 by the Versit consortium, which consisted of Apple Computer, AT&T (later Lucent), IBM and Siemens. In December 1996 ownership of the format was transferred to the Internet Mail Consortium, a trade association for companies with an interest in Internet e-mail.

Version 2.1 of the vCard standard is widely supported by e-mail clients. Version 3.0 of the vCard format is an Internet Engineering Task Force (IETF) standards-track proposal contained in RFC 2425 and RFC 2426. The commonly-used filename extension for vCards is .vcf.

Some PIM software products of the prior art are capable of synchronizing data with another PIM over a computer network (including mobile ad-hoc networks). This feature usually does not allow for continuous, concurrent data updates, but rather enables point-in-time updating between different computers, including desktop computers, laptop computers, and personal digital assistants.

Many methods exist for communicating via a data network. Instant messaging and e-mail are among the methods most commonly used by individuals. E-mail (electronic mail) is a store and forward method of composing, sending, storing, and receiving messages over electronic communication systems. E-mail may refer to both the Internet e-mail system based on the Simple Mail Transfer Protocol (SMTP) and to intranet systems that allow users within one organization to e-mail each other. E-mail messages are generally sent to an e-mail server that stores received messages in the recipient's e-mail mailbox. The user later retrieves these messages with either a web browser or an e-mail client that uses one of a number of e-mail retrieval protocols. While some clients and servers preferentially use vendor specific, typically proprietary protocols, most support the Internet standard protocols SMTP for sending e-mail and POP3 and IMAP4 for retrieving e-mail, allowing interoperability with other servers and clients. The Internet Message Access Protocol (commonly known as IMAP or IMAP4, and previously called Internet Mail Access Protocol, Interactive Mail Access Protocol, or Interim Mail Access Protocol) is an application layer Internet protocol that allows a local client to access e-mail on a remote server. IMAP4 and POP3 (Post Office Protocol version 3) are perhaps the two most prevalent Internet standard protocols for e-mail retrieval. E-mail clients can generally be configured to use either POP3 or IMAP4 to retrieve e-mail and in both cases use SMTP for sending. Many e-mail clients and servers support both protocols.

Instant messaging requires the use of a client program that hooks up an instant messaging service and differs from e-mail in that conversations are then able to happen in real-time or near real-time (whole lines of text being transmitted and displayed rather than letter-by-letter communication). There are many disparate protocols for instant messaging. However, this situation is typically dealt with by combining protocols inside the IM client application or inside the IM server application.

One, increasingly-popular object for storage and management with a PIM application is a picture (image) of an individual whose other personal information is stored. However, in practice, this piece of information is often missing. Also, the structured data a user has stored on a given system may be out-of-date even for those persons with whom the user frequently communicates. What is needed is an automatic or semi-automatic means for obtaining missing information and for updating previously-stored structured data using e-mail or other commonly-used messaging systems.

BRIEF SUMMARY OF THE INVENTION

A processor-based communications system is configured to request and/or receive certain information (data) from a remote system. In certain embodiments, the request for information is appended to a message being composed by the user either automatically or in response to user-activation of the feature. An illustrative example is a request for an electronic photograph of the recipient of an e-mail message for inclusion with the other contact information stored on the user's system. In some embodiments of the invention, the system is configured to parse incoming messages for the requesting information which may be automatically extracted and stored. In yet other embodiments, the system alerts the user to missing or outdated information and offers to append a request for new information to a message being composed or to dispatch a separate message containing a request for information. Recipients may be categorized and the information request tailored to the category of the recipient.

A system according to the present invention may be implemented on either or both of the sending side system or the receiving side system. Increased automation of the process is possible when both sending and receiving systems are configured in compatible implementations of the invention.

BRIEF DESCRIPTION OF THE SEVERAL VIEWS OF THE DRAWING(S)

DETAILED DESCRIPTION OF THE INVENTION

The invention may best be understood by reference to certain preferred embodiments. A number of different preferred embodiments are disclosed below.

While the techniques described herein may be embodied in virtually any structural context, for illustrative purposes including illustration of hardware, software and synchronization/PIM-data background, the following U.S. patent applications are hereby incorporated by reference: "State Based Synchronization" by Bertrand Serlet, filed Jan. 7, 2004 and having application Ser. No. 883541, and having publication number US20060069809A1; "A Method of Synchronizing Between Three or More Devices" by Toby Paterson and Jerome Lebel, having application Ser. No. 10/853,306 and filed May 24, 2004; "A Method of Synchronizing" by Toby Patterson and Jerome Lebel, having application Ser. No. 10/852,926 and filed May 24, 2004; and "Apparatus And Method For Peer-To-Peer N-Way Synchronization In A Decentralized Environment," having application Ser. No. 11/157,647 and filed Jun. 21, 2005.

In one embodiment, a programmed system presents the user with an option of adding a request for an electronic photograph to a particular communication sent electronically to another. In an illustrative example, the presented option may take the form of a "radio button" or pop-up dialog box in an e-mail editor. Selecting the option may result in a request for an electronic photograph of the recipient being added to the e-mail message. The request may be in the form of a postscript: "P.S. I don't have your photograph. If available, please attach one in reply." Alternatively, selecting the presented option may result in a separate message being sent to the recipient requesting a photograph. In such an embodiment, the subject line of the message may be pre-selected or encoded to facilitate recognition of a reply containing the requested photograph. Although the above-described illustrative example involves a request for an image file, it will be appreciated that any particular piece of information or data (particularly structured data) may be requested using the method of the present invention. In certain embodiments, the option may be presented to the user with a menu of items which may be requested from the recipient. The menu may include a text box for "other information" into which the sender may insert a custom or user-specific request. In addition, in certain embodiments, the menu may be altered according to data or metadata in the local PIM database.

Figure 1:
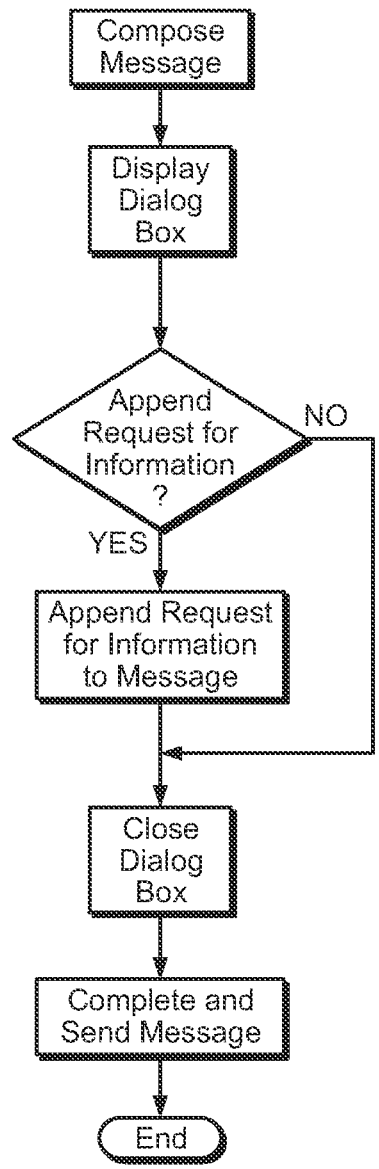
FIG. 1 is a flowchart depicting the steps in one embodiment of the invention.

A process as described above is illustrated in flowchart form in FIG. 1. A user may begin composing a message using, e.g., an e-mail editor (block 101). The system may detect that a new message is being drafted and display a dialog box (at 102) asking the user whether he or she wishes to append a request for contact information to the message being composed. If the user responds in the affirmative ("yes" branch at 103), the system automatically appends a pre-selected message to the communication (at 104) and closes the dialog box (block 105). The user may then complete the composition of the message and send it in the usual method at block 106.

In certain embodiments, the system may be configured to search the user's system for the requested data and, if found, request confirmation from the user that the request should be appended or sent notwithstanding the data found. The search may check a repository for a designated application or Personal Information Management [Manager] application. Alternatively, the search may involve a check of all applicable repositories for data of a certain type on the user's system. If existing data is found and the user nevertheless opts to send a request for data, the system may, in certain embodiments, present the option of sending the existing data to the recipient together with a request to confirm the accuracy and/or currency of the data.

Figure 2:
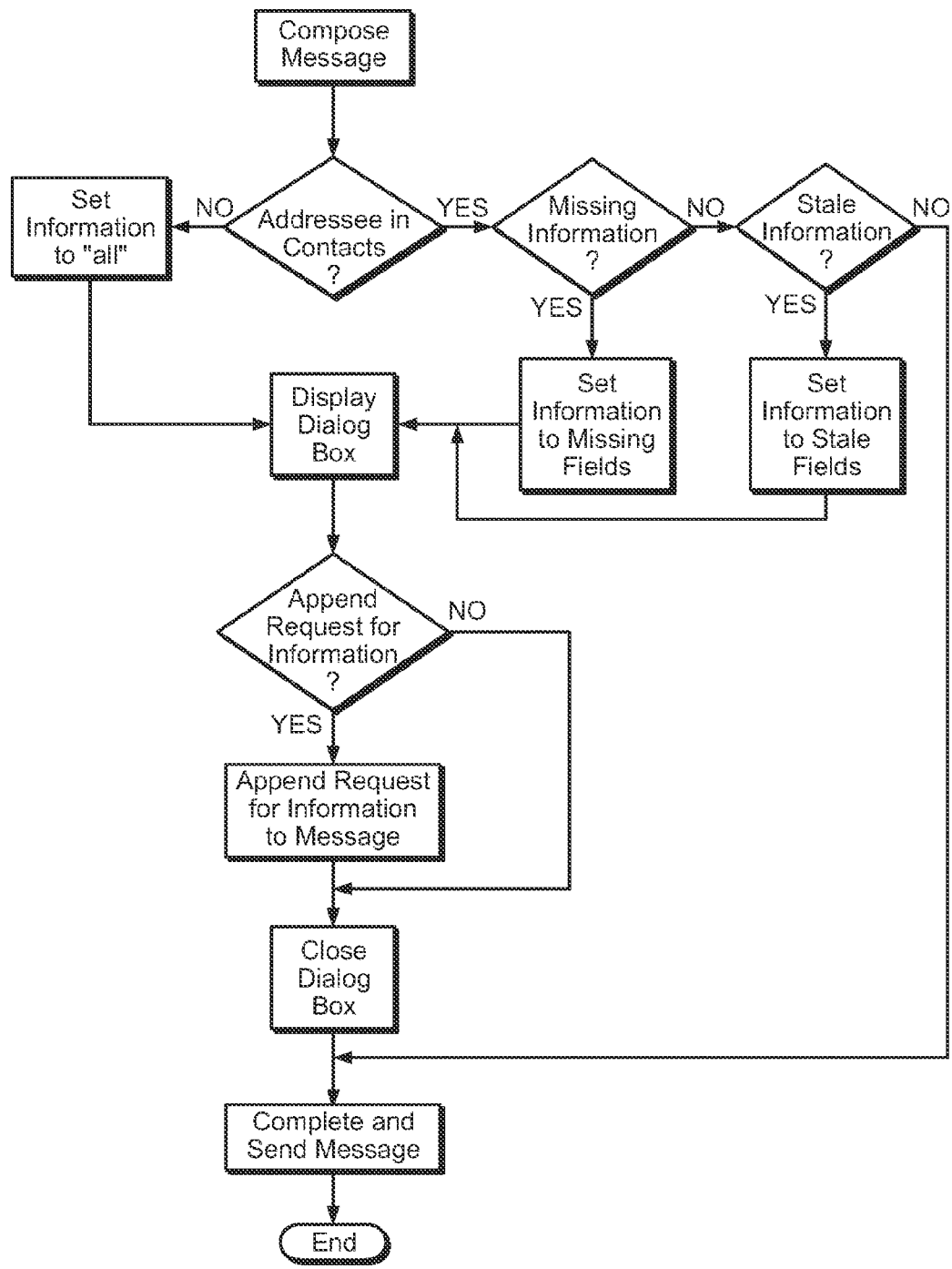
FIG. 2 is a flowchart depicting the steps in a second embodiment of the invention.

Such a process is shown as a flowchart in FIG. 2. The user begins a new communication by selecting one or more recipients for the message at block 201. At diamond 502, the system (in the background) determines whether contact information exists on the system for the recipient(s). If not ("no" branch at 502), the needed information is set to "all" (block 203), a dialog box is displayed to the user (at 206) asking whether a request for information should be appended to the message being composed and, if the reply is affirmative ("yes" branch at 209), a request for all contact information from the recipient is appended to the message being composed (block 210). The dialog box is then closed (block 211) and the user may complete the composition of the message and send it in the usual way (block 212).

In similar fashion, if a contact record exists on the system for the recipient ("yes" branch at 202) but certain fields have missing data ("yes" branch at 204), the information request can be customized for that missing data (block 207). Data which may be out-of-date may likewise be tested for at diamond 205 and, if found ("yes" branch at 205) may result in a request for confirmation of the data's accuracy (at block 208). Of course, in practice, blocks 204 and 205 may be combined or inter-changed so that either or both of missing/stale data may be checked in a single pass or in any order.

In another embodiment, an e-mail program interfaces with a Personal Information Manager program to request missing and/or updated information. Running in the background, the program searches the data currently of record for the person or persons in the recipient field of the e-mail being composed by the user. Missing and/or stale information may be flagged. The program may then automatically append a request to the e-mail asking the recipient to reply with the missing data. The request may be in the form of a postscript added to the e-mail. The author of the e-mail may be presented with a query by the system asking whether the requested for information should be appended. Alternatively, the system may be provided with an on-screen "radio button" or icon which may be activated by the user to cause the system to add a request for information to the outgoing e-mail message.

For example, a user may begin composing a message to Jane Doe by first entering the recipient's e-mail address in the "to" field of the message. While the e-mail editor continues to run in the foreground, the program would query the database of the Personal Information Manager in the background to determine what, if any, information is available on the system for Jane Doe. Alternatively, the query may be performed upon the user's indication—for example, from a drop-down menu or dedicated on-screen "button." Common data fields in the contacts portion of a personal information manager may include a person's name, title, business phone number, business fax number, home phone number, mobile phone number postal address, e-mail address, website URL and photograph.

In the illustrative example, let's say that the user's system has a contact entry for "Jane Doe" but is missing any entry in the fax phone number and photograph fields. If this feature were enabled by the user, the program might append a postscript to the e-mail text along the following lines: "P.S. It seems that I am missing your fax number and photograph. If you would be so kind as to click on "Reply" and supply that information in the form below, I can update my contact information. Fax number: _. Please attach an image file containing your photograph or insert it as an object here [ ]. Thank you in advance for your courtesy in reply."

In yet other embodiments of the invention, the program may generate and send a separate e-mail message to the recipient requesting the missing information. Again, such message generation may be automatic, the result of an affirmative reply to a query (e.g., a pop-up dialog box) or may be in response to user selection (e.g., activation from a drop-down menu).

Figure 3:
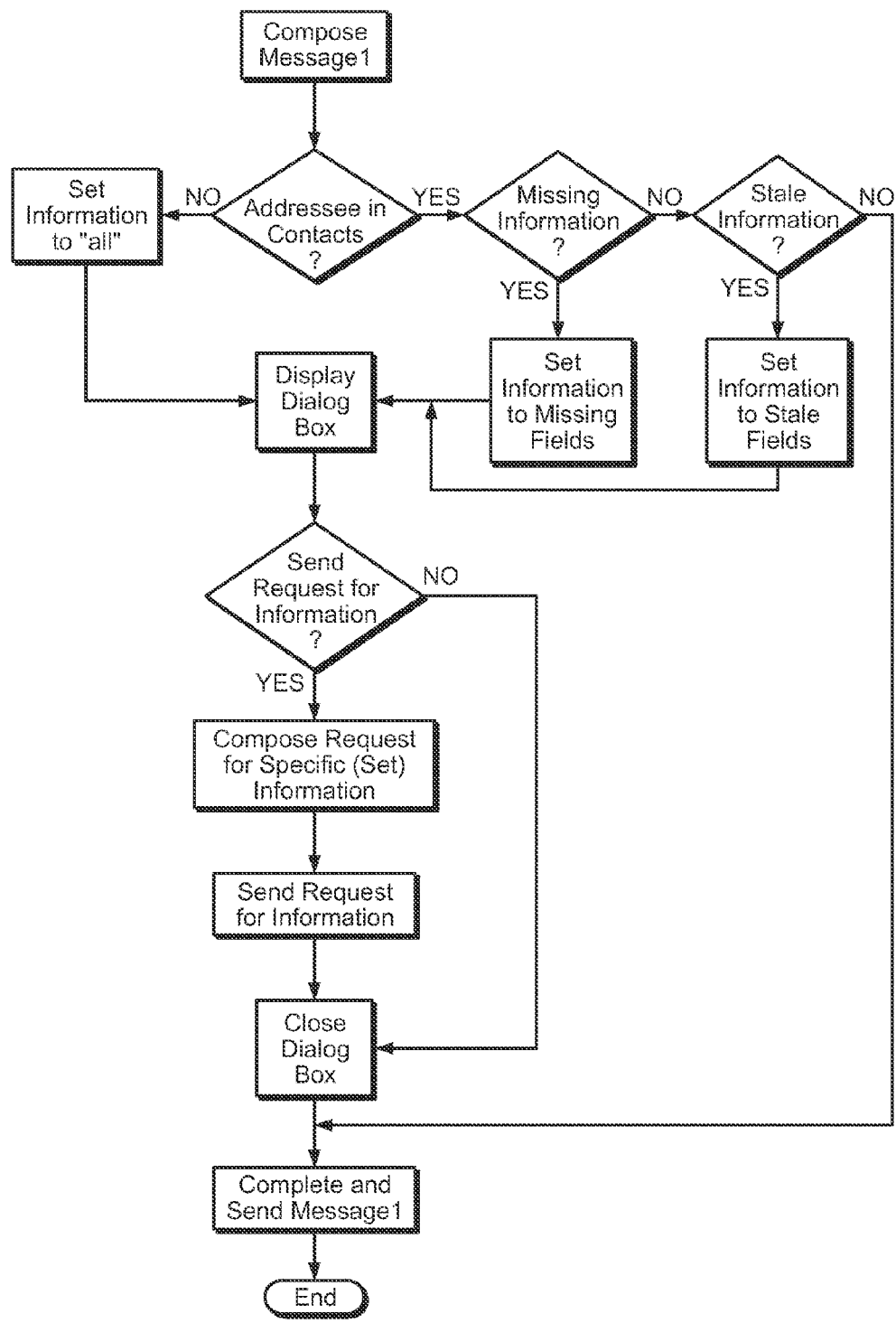
FIG. 3 is a flowchart depicting the steps in a third embodiment of the invention.

An embodiment of the invention wherein a separate communication is used to request information is illustrated in flowchart form in FIG. 3. A user may begin composing a message ("message1") at block 301 by designating one or more recipients. The system, in a multitasking mode, may query a database (at 303) to determine whether contact information exists on the system for the recipient(s) of message1. If a recipient is not found in the database ("no" branch at 303), the information request may be set to "all" (block 302) and the system may display a dialog box (at 306) asking the user whether he or she wishes to send a request for the missing contact information to the recipient. An affirmative reply ("yes" branch at 309) results in the automatic generation of a separate message, addressed to the recipient of message1, stating that the user does not have contact information for the recipient and requesting that the needed data be inserted in the form provided and returned to the sender (block 310). This request-for-information message may be sent immediately (block 311) or optionally after the sending of message1. The dialog box is then closed (at block 312) and the user may complete and send message1 in the usual way (at block 313).

If contact information does exist on the system for the recipient ("yes" branch at 303), then the contact record may be tested for missing and/or out-of-date information (diamonds 304 and 305, respectively). The information request may be appropriately tailored to request missing data and/or confirmation of potentially stale information (blocks 307 and 308). The system-generated, appropriate draft message is displayed (at 306) for the user's approval, prior to dispatch.

In certain embodiments of the invention, the program may monitor incoming e-mail to detect receipt of a reply message. To continue the illustrative example, subsequent to sending the request for missing information, the program may test incoming e-mails to identify those received from Jane Doe. The program may then parse the text of the message for the requested data and insert it into the appropriate fields of the contacts database. If the message includes an attached file, the file type may be examined to determine whether it is in an image file format. If so, the program may assume the image file contains the requested photo and store that image in the personal information manager as a contact photo. Alternatively, the system may display the photo and query the user as to whether the program should store the displayed image as the photo of "Jane Doe."

Figure 4:
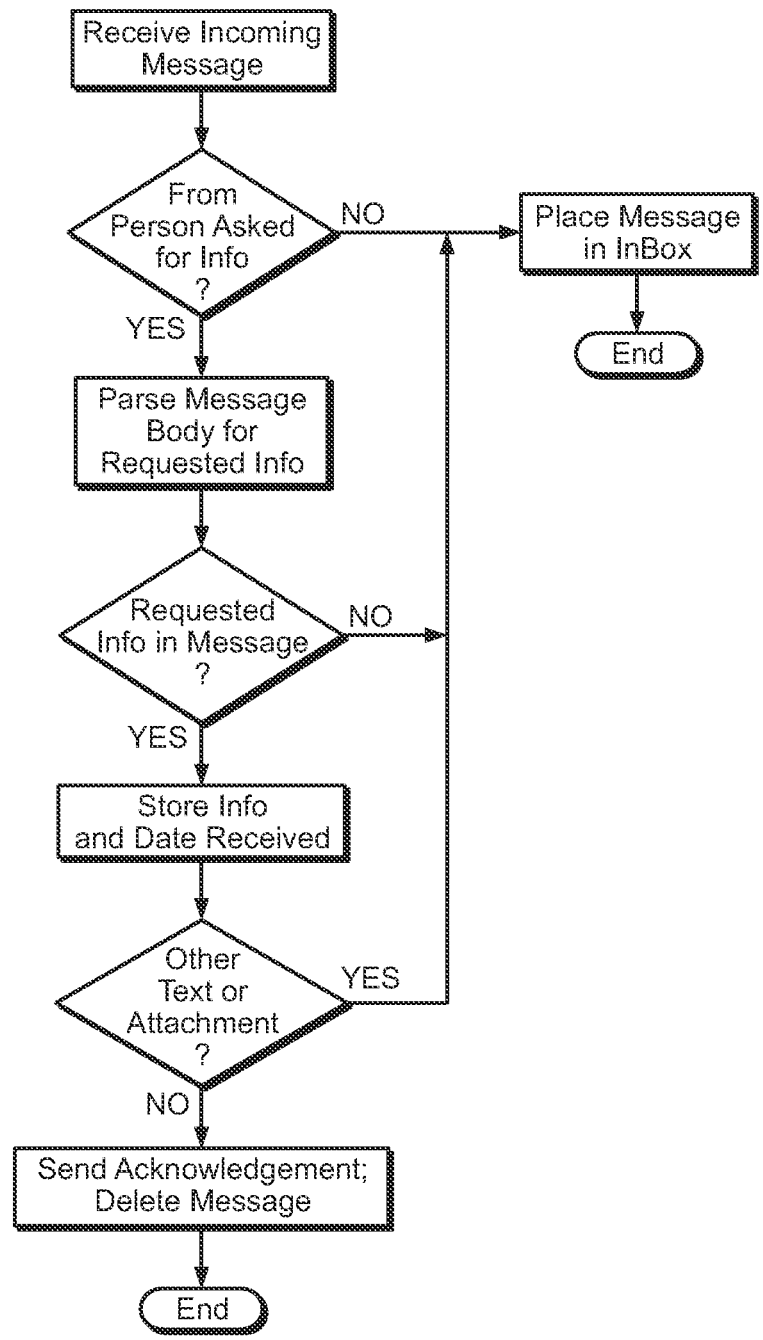
FIG. 4 is a flowchart depicting the steps in a fourth embodiment of the invention.

An embodiment which monitors incoming communications for previously-requested information is shown in the flowchart of FIG. 4. A message is received by the system at block 401. The sender's identity is compared to a stored list of persons to whom the system has sent requests for information at 402. If the message is not from such a person, it may be placed in the system's inbox (at block 403). If the message is from someone who owes the user data, the system parses the body and/or subject line of the message for the requested information (block 404). If the requested information is not found ("no" branch at 405), the message may be placed in the user's inbox for manual disposition (block 403). If the requested information is identified ("yes" branch at 405), the information is stored at block 406 and the date of receipt may be associated with the data for subsequent testing of the currency of the data. The system may parse the entire contents of the communication to determine whether any additional message is in the communication or if a file is attached (diamond 407) and if so, place it in the inbox for the user's action (403). If no other information is in the communication, the system may optionally dispatch an acknowledgement to the sender and delete the message (block 408) thereby requiring no involvement on the part of the user.

It will be appreciated that the above-described embodiments of the invention do not require any additional protocol beyond that required for the exchange of e-mail or other text-based communication. Typically, protocols are essential for the interoperability of systems; programs which send data to each other need to be based on some agreements on the format of the data and related issues. However, certain embodiments of the invention may be implemented without requiring the responding system to adhere to a particular protocol—the missing data may simply be extracted from a reply e-mail, instant message, or the like by parsing the reply.

As discussed above, in some embodiments of the invention, the "freshness" of data may be used as a criterion for requesting data or maintaining data. For example, a program may associate a freshness indication or modification date with the data in each field of a contact entry. Alternatively, the most recent date of data entry (or some indication of freshness) for a given contact may be stored. As described above, the program may query the database of contact information associated with the recipient(s) of an e-mail message being composed and determine whether the age of the stored data exceeds a pre-selected limit. The limit may be user-selected or fixed by the program. If the data might be stale—i.e., is older than the pre-selected limit—the program may offer to append a message to the e-mail requesting updated data or a confirmation that the stored data is still current. By way of example, the program may offer to append a message (or send a separate message) that says, in essence: "Here is the contact information I currently have for you. Please reply with any changes or additions on the form provided." The program may then monitor incoming e-mail (or other text-based communications) for a reply message containing the requested data. If a reply message is identified, the program may parse the message for changed data and insert that data into a database. In certain embodiments, a "date stamp" may be associated with the data and stored in the database for later use in, e.g., assessing the data's currency.

Certain embodiments may include a program which runs on the recipient's system and acts to quickly retrieve and send the requested information back to the requestor's system with minimal involvement on the part of the recipient. Such a program may be made available for downloading from a website (or network connection), and the requester may send a link to the website in a communication sent to the recipient. Alternatively, the message sent to the recipient by the requester may include the program as an attachment. In certain embodiments, the program may be in the form of a self-extracting compressed file.

Such a program (whether downloaded or emailed) may be configured to query the recipient for the identity of the particular Personal Information Manager in use on the recipient's system and then retrieve the requested information from that application and return it (e.g., by e-mail) to the requester. Other potential sources of commonly-sought information may be found in other self-identifying formats such as vcards, business cards, in-case-of-emergency (ICE) cards, system set-up information, system registration data, etc. In certain embodiments, the program may be configured to run a set-up routine if PIM data is not identified on the host system. Such a routine may display a form for data input from the user in order to create and store an electronic business card, v-card or the like on the recipient's system.

In yet other embodiments, contact information and the like may be exchanged using a website or other network-accessible object. For example, a website (which may be a secure website) may be configured to permit data to be both uploaded and downloaded in a standard format. Access to the website may be restricted by user ID's and passwords or other means known in the art. A first user may enter information (which may be contact information) in a form provided on the website. A second user may subsequently retrieve and store that information on their own system. In certain embodiments, the system may be configured to automatically forward data to one or more recipients either incrementally or periodically for user-selected or automatic integration in the user's system. The system may be configured to identify updates. Changes in the data may be flagged or a date may be associated with certain data fields so that a downloading system may automatically compare its stored data and update its records, as needed.

A website implementing certain embodiments of the invention may be configured to cause automatic testing of a system accessing the website to determine and display a user's options for complying with a request for certain information. For example, a determination may be made that there is data present and the methods available for transferring the data. In some embodiments, the data transfer may proceed automatically while in other embodiments the transfer may only proceed if the user signals agreement.

In certain embodiments, the above-described features may be enabled by the user (or system administrator) by e.g. setting system preferences, PIM preferences, e-mail preferences, or the like. For example, a given system may be configured to display a dialog box that, when sending a message, asks the user whether to request certain data from the recipient of the message. The data might be specific data, e.g., a picture of the recipient; missing data; data on the user's system that is older than a threshold value; or, all data necessary to create a new contact entry. In certain embodiments, the dialog box may present the requested data type for user selection.

It will be apparent to those skilled in the art that many permutations of data request triggering conditions may be selected and implemented on a system according to the present invention. For example, a request for data may be automatically made for a designated group (list) of recipients (e.g., those recipients in the user's contacts or a designated subset of a group), or a request for data may be made for every recipient or every recipient not on a list of exceptions. Likewise, groups of recipients on an exception list of groups may be excluded from an automatic request for information. As an additional feature, in certain embodiments a list may be maintained of contacts to whom the user wants to send data, e.g., a picture. Alternatively, separate lists may be maintained for each type of data and/or recipients who have requested data.

Various embodiments of the invention may be implemented on a processor-based system configured to receive messages from a remote system(s) —e.g., e-mail, Instant Messages, etc. Systems of the prior art offer the user the option of creating a new contact (record) based on the sender's address and/or updating the records of an existing contact. In one embodiment of the present invention, the receipt or opening of a newly-received message may trigger the display of a dialog box which asks the user whether a reply message should be dispatched to the sender asking for specific information. A menu of information may be displayed for user selection. The menu may identify missing information and may display existing, related information which may include a query as to whether updated or more recent information should be requested from the sender. As described previously, the request to be sent may include an invitation to reply with a coded message—e.g., a specific "subject" field—which the sending system may search for in incoming messages and if found parse the message for the requested information and automatically update the system's stored records (or create a new record).

Figure 5:
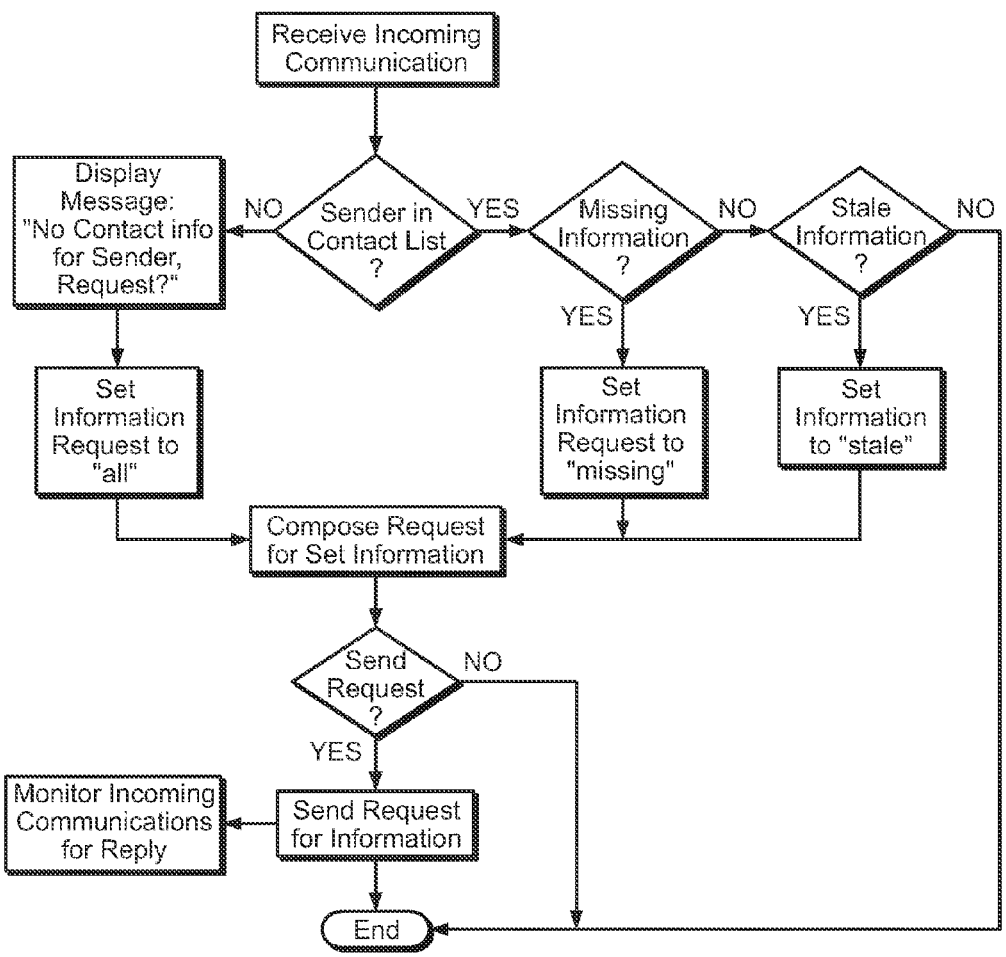
FIG. 5 is a flowchart depicting the steps in a fifth embodiment of the invention.

FIG. 5 is a flowchart showing the steps of an embodiment of the invention configured to respond to missing information about the senders of incoming messages. An incoming communication (e.g., an e-mail) is received by the system at block 501. The identity of the sender is compared automatically at 503 to a contact list stored by the system. If no information exists for the sender, a message to that effect is displayed (block 502), the required information is set to "all" (block 506) and an message is automatically composed by the system requesting all contact information of the sender (block 507). The draft message may be displayed for the user's approval (block 510) and an affirmative response results in the message being sent (block 512). Optionally, the system may monitor incoming communications for a message in reply to the request for information (block 511).

If contact information does exist on the system for the sender of the message, the stored information may be tested for missing and/or stale data. At diamond 504 in FIG. 5, a test is conducted for empty data fields. If found, the missing elements are placed on an information request list (at block 508) and an appropriate message is automatically composed (block 507). Out-of-date information may similarly be tested for at diamond 505. Any data whose age exceeds a preselected limit may be placed on the information request list (at block 509) and, at block 507, the system may compose a message asking the sender whether the stored data is still current. It will be appreciated that a record may have both missing and stale data in which case an appropriate message asking for both a confirmation of existing data and data for the missing fields may be generated at block 507. Furthermore, the data may be stale by virtue of an expiration date (e.g. set by the originator or otherwise), and the message may be altered accordingly.

Embodiments of the invention which prompt the user upon receipt of a message may employ the features described above for embodiments which generally initiate the process upon or in conjunction with the sending of a message to another. For example, system preferences may be set by the user (or system administrator) such that the option of requesting information is presented upon the receipt of each message. Alternatively, the system preferences may be set to inquire about sending a request for information only when the received message is from a sender in a designated group of senders—e.g., those on a user's contact list. In certain embodiments, a list may be maintained of contacts to whom the user desires to send certain data (e.g., a picture). Separate lists may be maintained for each type of data and/or lists may be maintained of persons to whom the user is obliged to send information. Each of these may be used as a criterion for presenting the option to the user of requesting information.

In the same way, specific groups of senders may be designated for automatic requests for information—one such group being all senders, i.e., an automatic request for information is sent to the originator of any received message. Alternatively, an automatic request for information may be sent to anyone not on an exception list. A preference setting may result in an automatic request for information being generated and sent to every sender except groups of senders on an exception list of groups. In yet other embodiments, the senders of unsolicited bulk e-mail ("spam") may be automatically excluded from requests for information by return message.

One particular embodiment of the invention comprises stored programs on both the sender's and the recipient's programmed systems for implementing the process. Such an embodiment provides ease of implementation with minimal involvement on the part of the users. Such systems may be configured such that users merely set preferences to designate the potential disposition of different pieces of data and an exchange of data may occur without any active user involvement (other than setting preferences).

For example, by setting appropriate preferences, a user might enable the automatic sending of name, business address and business phone number(s) in response to a request from any compatible system. However, the system might be configured (again, by user preference settings) to only send an image of the user to a requesting system if the requester were a member of the users personal contacts. In certain embodiments, if a requester who is not a personal contact were to request an image of the user, the system may display a dialog box asking the user's permission to send the image to the specific requester. For certain types of sensitive information (e.g., financial information, credit card numbers, bank account numbers, etc.) a password or other type of security measure may be employed as part of the approval-to-send process. Thus, even in situations that may require user interaction, the user's involvement may be limited to a simple yes/no response to a dialog box or selecting certain information to be sent from a presented listing of available information.

In yet other two-sided embodiments (i.e., embodiments wherein both sending and receiving systems are programmed with compatible software), a user might embed two contact cards in each message sent—one card containing contact information for the sender and the other the contact information for the recipient stored on the sender's system. The receiving system may be configured to analyze the contact information sent to determine whether it matches the information stored on the receiving system. If necessary, correction or updating may proceed automatically (or with specific approval of the user). Similarly, a discrepancy with the recipient's contact information may trigger an automatic reply to the sender with corrected information. The original sender may be prompted to accept or reject any new information so sent.

Two-sided embodiments may be set up using the techniques discussed above such as sending software as an attachment or sending a link to a website or a file server having the appropriate software available for downloading. Each system may be configured with one or more versions of a personal record for sharing—different versions being designated for different recipients or groups of recipients. For example, a system might be configured to send a business picture to any system requesting a picture but a casual photo (in lieu of or in additional to the business photo) to certain requesters or groups of requesters. Similarly, a user's mobile phone number, pager number or a home phone number may be designated as available to send to certain (but not all) requesters.

Although the illustrative embodiments described above are concerned primarily with e-mail messages, it should be appreciated that the methods of the invention may be applied to any system having nodes that incorporate user-related data. By way of example, but not limitation, such systems may include instant messaging, text messaging, conference calls, video conferencing, file sharing systems, or any system having a sending user (or sending node) and one or more receiving users (or receiving nodes) wherein the nodes or users have access to data that may be of interest to other users or nodes. The data itself may be anything—PIM data and images of users in particular are merely used herein as representative of information (data) that is often desired and often in need of being confirmed, updated or refreshed.

Data exchanged by systems according to the present invention may have an expiration date or time associated therewith that may result in the data being deleted after a certain period of time has elapsed or may cause a warning to be displayed with the data alerting the user to the possible suspect status of the information. The expiration date may be set by the data originator or recipient. In certain embodiments, the storing system may automatically send (or prompt the user for permission to send) a request for updated information when a pre-selected period of time has elapsed from the date associated with the data. In yet other embodiments, a sending system may store the date that certain information was sent to a certain requester and automatically send updated and/or newly available information after a certain period of time has elapsed.

Although the illustrative embodiments have described several different ways in which a request-for-information message may be transmitted, those skilled in the art will appreciate that many methods exist or may be envisioned for effecting such a transmission. For example, the request for information may take the form of a field in a message header, analogous to the conventional subject, date, sender and recipient fields. The request may be an addendum to the message body at the front (top), end (bottom) or as a sidebar to the message. Such an addendum may be an automatically-generated message such as: "Please send me a picture of yourself; I am missing one from your contact card." Furthermore, a user interface may provide a selection of automatically generated messages. Alternatively, the addendum or sidebar message may be drafted by the user in a preferences pane. Different messages may be associated with different data types or the same message may be used with all data types. The message or addendum may include instructions useful to the recipient in complying with the request. Alternatively the message or addendum may include a link to such instructions rather than the instructions per se.

Although the invention has been described in detail with reference to certain preferred embodiments, variations and modifications exist within the scope and spirit of the invention as described and defined in the following claims.

The invention claimed is:

1. A method comprising the steps of:
   identifying an email recipient during the composition of a first email message, the first email composed by a sender;
   searching, based on the identification, a local data store for personal information relating to the email recipient, the searching yielding certain data;
   determining whether the date of entry of the certain data in the local data store exceeds a pre-defined limit;
   requesting from the sender authorization to append to the first email message a request for updated personal information if the date of entry of the certain data in the local data store exceeds the pre-defined limit; and
   automatically appending, in response to receiving the sender's authorization, the data request to the first email message.

2. The method of claim 1 wherein the certain data comprises an indication of specific items of information regarding the email recipient, and wherein the request for personal information comprises a request for one or more of the specific items.

3. The method of claim 2 wherein the indication of specific items is an indication of a photo.

4. The method of claim 1 wherein the request for personal information is sent as part of the first email message.

5. The method of claim 1 wherein the local data store is associated with an application program for personal information management.

6. A method comprising the steps of:
   identifying an email recipient during the composition of a first email message, the first email composed by a sender;
   searching, based on the identification, a local data store for personal information relating to the email recipient, the searching yielding certain data;
   determining whether the date of entry of the certain data in the local data store exceeds a pre-defined limit;
   requesting from the sender authorization to append to the first email message a request for updated personal information if the date of entry of the certain data in the local data store exceeds the pre-defined limit;
   automatically appending, in response to receiving the sender's authorization, the data request to the first email message;
   receiving a second email addressed to the sender of the first email;
   identifying a sender of the second email;
   examining a local data store to determine if there is an indication that a previous request for personal information was sent by the sender of the first email to the sender of the second email; and
   parsing the second email, when there is an indication, for personal information regarding the sender of the second email and automatically engaging in a transfer of missing personal information that comprises sending personal information regarding the sender of the first email to the sender of the second email.

7. The method of claim 6 wherein the step of automatically engaging in a transfer of personal information comprises parsing the second email for personal information of the sender, extracting personal information of the sender from the second email and adding the personal information of the sender of the second email to a local data store.

8. The method of claim 6 wherein the indication comprises a list.

9. A method comprising the steps of:
   identifying an electronic communication recipient during the composition of a first electronic communication message, the first electronic communication composed by a sender;
   searching, based on the identification, a local data store for personal information relating to the first electronic communication recipient, the searching yielding certain data:
   determining whether the date of entry of the certain data in the local data store exceeds a pre-defined limit;
   requesting from the sender of the first electronic communication authorization to append to the first electronic communication a request for updated personal information if the date of entry of the certain data in the local data store exceeds the pre-defined limit:
   automatically appending, in response to receiving the sender's authorization, the data request to the first electronic communication;
   receiving a second electronic communication having a subject line, sent by a sender and addressed to the sender of the first electronic communication;
   automatically determining, in response to receiving the second electronic communication, whether a request for the sender's personal information was previously sent to the sender of the second electronic communication;
   parsing the subject line of the second electronic communication to determine if the second electronic communication is in reply to a request that was previously sent to the sender of the second electronic communication and, if so, parsing the body of the second electronic communication to determine an indication regarding items of the sender's personal information, such items indicated in a manner to accommodate the parsing;
   extracting one or more of the indicated items; and
   storing one or more of the indicated items in a local data store.

10. The method of claim 9 wherein the communication is an email.

11. A non-transitory program storage device having instructions stored thereon that when executed by a data processing apparatus cause the data processing apparatus to:
    identify an email recipient during the composition of a first email message, the first email composed by a sender;
    search, based on the identification of the email recipient, a local data store for personal information relating to the email recipient, the search yielding certain data;
    determine whether the date of entry of the certain data in the local data store exceeds a pre-defined limit;
    request from the sender authorization to append to the first email message a request for updated personal information if the date of entry of the certain data in the local data store exceeds the pre-defined limit; and
    automatically, in response to receiving the sender's authorization, append the data request to the first email message.

12. A non-transitory program storage device having instructions stored thereon that when executed by a data processing apparatus cause the data processing apparatus to:

identify an email recipient during the composition of a first email message, the first email composed by a sender;

search, based on the identification, a local data store for personal information relating to the email recipient, the searching yielding certain data;

determine whether the date of entry of the certain data in the local data store exceeds a pre-defined limit;

request from the sender authorization to append to the first email message a request for updated personal information if the date of entry of the certain data in the local data store exceeds the pre-defined limit;

automatically append, in response to receiving the sender's authorization, the data request to the first email message;

receive a second email addressed to the sender of the first email;

identify a sender of the second email;

examine a local data store to determine if there is an indication that a previous request for personal information was sent by the sender of the first email to the sender of the second email; and parse the second email, when there is an indication, for personal information regarding the sender of the second email and automatically engage in a transfer of missing personal information that comprises sending personal information regarding the sender of the first email to the sender of the second email.

13. A non-transitory program storage device having instructions stored thereon that when executed by a data processing apparatus cause the data processing apparatus to:

identify an electronic communication recipient during the composition of a first electronic communication message, the first electronic communication composed by a sender;

search, based on the identification, a local data store for personal information relating to the first electronic communication recipient, the searching yielding certain data;

determine whether the date of entry of the certain data in the local data store exceeds a pre-defined limit;

request from the sender of the first electronic communication authorization to append to the first electronic communication a request for updated personal information if the date of entry of the certain data in the local data store exceeds the pre-defined limit;

automatically append, in response to receiving the sender's authorization, the data request to the first electronic communication;

receive a second electronic communication having a subject line, sent by a sender and addressed to the sender of the first electronic communication;

automatically determine, in response to receiving the second electronic communication, whether a request for the sender's personal information was previously sent to the sender of the second electronic communication;

parse the subject line of the second electronic communication to determine if the second electronic communication is in reply to a request that was previously sent to the sender of the second electronic communication and, if so, parse the body of the second electronic communication to determine an indication regarding items of the sender's personal information, such items indicated in a manner to accommodate the parsing;

extract one or more of the indicated items; and store one or more of the indicated items in a local data store.

14. A system for populating or updating one or more fields in a database of personal contact information comprising:

one or more processors configured to perform operations comprising:

identifying an email recipient during the composition of a first email message, the first email composed by a sender;

searching, based on the identifying operation, a local data store for personal information relating to the email recipient, the searching yielding certain data;

determining whether the date of entry of the certain data in the local data store exceeds a pre-defined limit;

requesting from the sender authorization to append to the first email message a request for updated personal information if the date of entry of the certain data in the local data store exceeds the pre-defined limit; and automatically appending, in response to receiving the sender's authorization, the data request to the first email message.

* * * * *